Patented Mar. 13, 1951

2,544,667

UNITED STATES PATENT OFFICE 2,544,667

WERNER-TYPE CHROMIUM COMPOUNDS AS LAMINATING AND COATING COMPOSITIONS

Max T. Goebel, Rocky River, and Ralph K. Iler, Cleveland Heights, Ohio, assignors to E. I. du Pont de Nemours & Company, Wilmington, Del., a corporation of Delaware No Drawing. Application April 27, 1946,
Serial No. 665,609

16 Claims. (Cl. 154—140)

This invention relates to novel compositions and processes for producing them, to processes employing these compositions for effecting chemical bonding between diverse materials, and to articles so bonded. More particularly, the invention is directed to complex compounds of the Werner type in which trivalent nuclear chromium atoms are coordinated with methylologen groups through organic acido groups, the ratio of nuclear metal atoms to such coordinated groups being about from 1:1 to 10:1; to processes for making Werner-type complex compositions comprising effecting contacts, in solution, between methylologen-substituted organic acido groups and basic salts of chromium, such salts being salts of monobasic acids having a basicity no greater than about 50%; to processes in which chemical bonding is effected between diverse materials by bonding the metal atom of an acido-methylologen Werner complex compound of said metal to a material having a negatively charged surface and polymerizing a material capable of polymerizing through a methylol group in contact with the methylologen group of the complex, whereby a chemical bond is formed between the complex and the polymer; and to the chemically bonded articles so produced.

The desirability of effecting improved bonding between diverse materials has been recognized in a variety of situations. It has been realized that composite structures made up of dissimilar materials could possess the advantageous properties of each of the constituent materials and at the same time have additional, especially desirable properties resulting from the combination, if only suitable ways of effecting permanent joining of the materials could be found. Thus, it was proposed to embed a mass of fibers, such as rayon cord, in a continuous phase of a diverse material, rubber, to produce a structure having the strength of the fibers and the elasticity of the rubber and a combination of properties especially useful in tires. Unfortunately, rubber did not have as high a degree of affinity for rayon as was required, and the lack of bonding was an obstacle in the realization of the expected advantages.

When a material, such as a fiber, is embedded in another material, the latter may be said to adhere by mechanical bonding. The fiber may be squeezed so tightly that no movement at the interface will occur. However, if the fiber is a substance having a hydrophilic surface, and the embedded fiber structure is immersed in water in such a way that contact between the fiber and water is possible, the water may be found to penetrate the mechanical bond and loosen it, so that the strength of the bond falls off rapidly. In this manner composite structures which have excellent dry strength are rendered unsuitable for purposes where wetting is likely to occur, such as in outdoor exposure.

The present invention is concerned with chemical bonds, in contradistinction to the mechanical bonds above described, and to such bonds which are resistant to the action of water.

Now according to the present invention it has been found that by processes in which contact, in solution, is effected between methylologen-substituted organic acido groups and basic chromium salts of monobasic acids, the basicity of the salts being no greater than about fifty per cent, there may be produced novel complex compounds of the Werner type and that by bonding the metal of such a metal-nuclear complex to a material having a negatively charged surface and polymerizing a material capable of polymerizing through a methylol group in contact with a methylologen group of the complex, chemical bonding may be effected between diverse materials with the production of bonded structures having improved properties.

The novel metal complex compounds of this invention are coordination compounds of the Werner type and are not to be confused with the normal metal salts. Thus, a composition in which the acido groups are coordinated with the metal differs radically in chemical properties from a composition in which the acido groups are held only by primary valence bonds such as ionic bonds. Such observed differences in properties may be explained on the basis of structure rather than empirical composition, and Werner's theory of complex compounds affords a convenient and logical basis for such an explanation.

According to the Werner theory, atoms may exert auxiliary valences as well as the principal valences occurring in simple compounds. These auxiliary valences may act to hold various groups to the atom exerting them, and the atom exerting the principal and auxiliary valences may become the nuclear atom of a complex compound or complex ion.

With particular reference to chromium, for instance, it has been found that the total number of groups which may be held within the complex by the combined principal and auxiliary valences is six. The groups so held are referred to as "coordinated groups" and chromium is said to have a "coordination number" of six. Other groups may also be associated with the chromium, but when this is the case such additional groups are present as ions and are outside of the chromi-nuclear complex. Moreover, there may be more than one chromi-nuclear atom within the complex, the chromium atoms being linked together by reason of being coordinated thru common groups known as bridging groups. With respect to each chromium atom, each bridging group occupies but a single coordination position, so that an additional five coordination groups may be present on the atom.

In accordance with the above-stated Werner theory, the compositions of this invention may be described as Werner complex compounds characterized by having therein a nuclear trivalent chromium atom coordinated with a metylologen group through an organic acido group. Such acido groups, which for convenience of reference will hereinafter be designated as "functional" acido groups, may be present as simple coordinated groups held by either principal or auxiliary valences, or they may be present as bridging groups between two nuclear metal atoms. Particular acido groups may conveniently be designated by adding the suffix "ato" to the first part of the name of the acid corresponding to the acido group. For instance, p hydroxybenzoic acid gives "p hydroxybenzoato" groups, and p hydroxyphenoxy acetic acid gives "p hydroxyphenoxy acetato" groups.

The fact that the functional groups are inside, rather than outside, the coordination spheres of the metal atoms probably accounts for the unusual chemical properties of the compositions such as the fact that they are soluble in water and are adsorbed on negatively charged surfaces from aqueous solutions. It will be understood that there may be more than one metal atom within the complex and that the metal atoms may be held together by bridging groups other than acido groups, so that for each functional acido group there may be several nuclear metal atoms within the complex, it being necessary only that within the complex there is at least one nuclear metal atom coordinated with a functional acido group. Preferably, however, the number of metal atoms per methylologen-substituted acido group will not be more than about ten.

The functional acido group coordinated with the nuclear metal atom in a composition of this invention should be combined with a methylologen group. The term "methylologen" is here used to refer to molecular configurations in which the methylol group, —$CH_2OH$, is present or is formed in the presence of formaldehyde. The class of compounds comprehended by the term "methylologens" is well recognized in the art; in "Synthetic Resins and Allied Plastics" edited by R. S. Morrell, 2nd edition, at page 117, reference is made to "those compounds (phenol and urea, among others) which have the property of forming primary alcohol groups with formaldehyde." A methylologen may contain substitution groups such as carboxyl groups or other acido groups, and in such case the portion of the molecule capable of forming methylol groups is herein referred to as a "methylologen group." It will be understood, of course, that one may consider the acido group as the principal portion of the molecule and refer to "methylologen-substituted acido groups." The union between the acido group and the methylologen group may be direct or it may be through another chemical group such as a hydrocarbon chain.

While the methylologen group may be any group capable of forming the methylol radical in the presence of formaldehyde, particularly excellent results have been obtained, and the invention is of particular importance when the methylol group is a phenolic- or a urea-group.

In a composition of this invention the ratio of nuclear metal atoms per functional acido group within the complex preferably should be from about 1:1 to about 10:1. When two or more nuclear metal atoms are coordinated with a single acido group within the complex, the metal atoms may be coordinated with each other thru bridging groups. Various groups may function in this bridging capacity, examples, for instance, being hydroxyl (OH), aquo ($H_2O$), and acido groups, either functional or non-functional.

The groups, other than the functional acido groups, with which metal atoms are coordinated in the compositions of this invention are of secondary importance only. These groups preferably should be, from the standpoint of valence, either neutral or monovalent. The neutral groups are of course held by auxiliary valence bonds, aquo groups ($H_2O$) being a typical example. The monovalent groups are negative and are typified by such groups as chloro, bromo, formato, acetato and nitrato groups. It will be observed that groups of this type are characteristic of the anions of monobasic acids and that metal compounds containing them are salts of monobasic acids.

Acido groups which are not coordinated with the metal may, of course, be present. Such groups may be ionizable and may even ionize to give ions of the same acid which is coordinated with the metal. For instance, in a crotonato chromic chloride there may be present, in addition to the coordinated crotonato group, anions of crotonic acid which can ionize off to give crotonate ions. Similarly, such uncoordinated groups may be anions of inorganic monobasic acids such as hydrochloric acid.

The method of making a novel composition of this invention may be generically described as effecting contact in solution between methylologen-substituted organic acido groups and basic metal salts of monobasic acids, the metals being those having a resistivity less than 50 microhm-centimeters at 20° C. and having 11 to 22 electrons in their two outermost energy levels, and the basicity of the salts being no greater than about 50%. The processes may be varied considerably as to details depending upon the particular composition which it is desired to produce.

The solvent used may be any substance capable of dissolving the reactants or holding them in solution. Inert solvents such as chlorinated hydrocarbons, and especially carbon tetrachloride, are satisfactory. Water may also be used, although in this case it will generally be desirable to work in as concentrated a solution as possible.

The acido groups taking part in the reaction may be derived from suitable acids such as have already been described above. The functional acido groups may also be derived from salts or esters containing acido groups. For instance, the presence of p hydroxybenzoato groups may be effected by hydrolysis of the methyl ester of p hydroxybenzoic acid, or by acidification of the sodium salt of the acid. It will be understood, of course, that the acido group is not present alone in any case but that the manner in which it is associated in the solution initially is relatively unimportant so long as a dissociation can occur to give the acido group. It has been found that carboxyl groups are particularly effective as coordinating groups and their use constitutes a preferred practice of this invention.

The presence in the reaction mixture of a basic metal salt of a monobasic acid may be effected in a variety of ways. One way is to add the previously prepared basic salt. In the case of chromium as the metal, for instance, basic chromic nitrate, $Cr(OH)(NO_3)_2 \cdot 5H_2O$ may be added in this manner. Another way is to heat a trivalent chromium salt such as chromic chloride hexahydrate

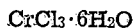
$CrCl_3 \cdot 6H_2O$ in the reaction mixture, whereby a rearrangement and dehydration of the chromic chloride takes place with the formation of a basic salt.

A particularly preferred practice is to form the basic metal salt in the reaction mixture by reducing a multivalent compound of the metal to a compound in which the metal has a lower valence.

Thus, in the case of chromium, chromyl chloride or chromic oxide may be reduced with an agent such as an alcohol. The alcohol in such case may act also as a solvent for the reaction mixture.

In preparing a basic salt according to this preferred practice certain precautions should be observed. The basic metal salts have a marked tendency to coordinate with hydroxyl groups, and by reason of two metal atoms coordinating with a single hydroxyl group, to form compounds of high molecular weight, this process being known as "olation." As olation takes place, compositions of high molecular weight are formed which are insoluble or only sparingly soluble in water. To minimize such olation it is ordinarily desirable to use the basic metal salt immediately after its preparation. Thus, in a preferred process the acido group is added immediately after the reduction has taken place.

As a reducing agent it has been found particularly advantageous to use alcohols and especially secondary alcohols.

The basic metal salt should be a salt of a monobasic acid, that is, an acid having a single ionizable hydrogen. The acid may be organic such as acetic or propionic, or it may be inorganic, such as hydrochloric, nitric, or hydrobromic.

The basicity of the metal salt should not be greater than 50%. The percentage of basicity of the salt may be defined as a measure of the extent to which hydroxyl ions have replaced the anions of the monobasic acid in the normal salt. In the case of the metal, chromium, for instance, chromic chloride hexahydrate, $CrCl_3 \cdot 6H_2O$, is a chromic salt of the monobasic acid, hydrogen chloride, having 0% basicity. When the hydroxyl group replaces one of the chlorine atoms a basic salt, $Cr(OH)Cl_2 \cdot 6H_2O$ is formed, and since one-third of the anionic groups of the monobasic acid has been replaced, this composition is said to be 33⅓% basic. Similarly, if two of the chlorine atoms had been replaced, the compound would be 66⅔% basic. In the present process the basicity of the metal salt should not exceed about 50% regardless of whether the salt is added as such or is formed in situ by the reduction of a multivalent metal compound. So long as there is any basicity the Werner complex compounds will form, so that the basicity may be only a fraction of 1% if desired.

Having prepared a Werner-type complex compound by such a method as is above-described, one may, according to this invention, employ the composition for chemically bonding diverse materials by processes in which contact is effected between the metal of the complex compound and a material having a negatively charged surface, and a material capable of polymerizing through a methylol group is polymerized in contact with a methylologen group of the complex.

In any bond between two surfaces there are two distinct types of molecular forces involved. The first are physical or Van der Waals forces commonly having an energy of the order of 2,000 to 10,000 calories per molecule. The second type are chemical or covalent bonds, having an energy of from 10,000 to 200,000. It is the chemical, rather than the physical, type of adhesive bonds with which this invention is concerned.

It will be understood that in any process for adhesively joining two or more materials the materials being joined are essentially in the solid state. For purposes of the present discussion it will be considered that plastic materials, which will flow under definite stress, are essentially in the solid state.

When two solid materials are adhesively joined their surfaces are brought into as close proximity as possible. Where both materials are rigid, almost invariably there is a lack of conformity of the surfaces to each other, so that an intermediate adhesive layer must be employed which is sufficiently fluid to fill the irregularities in the solid surfaces and thereby establish substantial conformity between the surfaces. The mere ability thus to provide a substantially continuous interface between materials to be adhesively joined is not in itself sufficient to make a substance a good adhesive. In addition, the adhesive must have a definite affinity for the surfaces being joined. Where diverse materials, that is, materials having different chemical or physical natures are being joined a special problem is presented because an adhesive having an affinity for one of the materials may have no affinity for the other. This problem has been solved by the present invention according to which it has been found advantageous to treat the unbonded solid surface with a material of dual chemical structure such that one part of the structure will react with the solid surface, and the other part with the adhesive, thus creating a chemical bond. Such intermediate reagent of dual chemical functionality for purposes of the present description, is referred to as a "bonding agent."

It will be apparent that the need for a bonding agent may occur, not only in cases where solids are to be joined by adhesive but also in cases where a plastic coating is to be applied to a solid surface. The plastic coating may of course be applied as a liquid which subsequently is hardened to a solid. The coatings may be quite thin, as a paint or varnish film, or relatively thick, as in the case of plastic-inlaid objects. The bonding agent may be applied, not only where a thin adhesive layer is used between two solid surfaces, but also where solid fibers such as glass or cords of textiles such as rayon are embedded and thus held in an assembly in a plastic medium such as phenol-formaldehyde plastic.

One of the two diverse materials which may be bonded according to a process of this invention is a material having a negatively charged surface. Such materials are characterized by containing a substantial proportion, that is, above about 5%, of an element selected from the group consisting of oxygen and nitrogen. These elements may be present in highly polar groups such as, for instance, OH, NH₂, —COC—, —NH—, C—O, COOH, and SO₃H. Thus, there are included as materials having negatively charged surfaces ceramic materials, vitreous masses, glass, cellulose (such forms as wood, paper, cotton, hemp, cellophane, rayon and cellulose acetate), and polyamide materials, in such forms as wool, silk, gelatin, synthetic protein fibers, leather, and hides. Also included are solid materials bearing oxide or hydroxide film such as may occur on metals.

As the other of the materials which may be bonded there is used a material capable of polymerizing through a methylol group. Such materials may be characterized as alkylol-condensation polymers or as thermo-setting aldehyde polymers. Included are such plastics as phenol-formaldehyde, urea-formaldehyde, thiourea-fomaldehyde, phenol-furfural, and melamine-formaldehyde plastics.

The bonding operation is carried out by forming a film or layer of the Werner-type metal complex compound at the interface between the surfaces of the diverse materials being joined and effecting polymerization of the material capable of polymerizing through a methylol group in contact with a methylologen group of the complex. The material to be polymerized may be applied as the monomer or as a partially polymerized monomer. An aldehyde will, of course, be present in the incompletely polymerized plastic and such aldehyde will be effective in the formation of methylol groups. The polymerization may be assisted by applying heat and by the presence of polymerization catalysts. The tenacity of the union between the methylologen group of the complex and the polymerized material suggests that interpolymerization occurs between the methylologen and the material polymerized, but applicants do not limit their invention to this explanation of the mechanism of the reaction.

The nature of this invention and its manner of application will be better understood by reference to the following illustrative examples.

*Example I*

To make a complex composition of this invention, 87.6 parts of basic chromium solution having a basicity of 33.3% and containing 6.85% chromium was refluxed with 9 parts by weight of 2,4 dihydroxybenzoic acid and 3.4 parts of isopropanol. There was obtained a solution of the complex containing 6% chromium. The solution remained clear when diluted with water.

By treating glass with the complex compound and then heating a partially polymerized phenol-formaldehyde resin in contact with the treated glass, it was found that the phenol-formaldehyde plastic was tenaceously bound to the glass and, as compared with similar glass-plastic structure in which the chromium complex was not used, the resistance of the bond to loosening by soaking in water was remarkably improved.

*Example II*

A composition of this invention was made by heating together under reflux 87.7 parts of basic chromium solution having a basicity of 33.3% and containing 6.85% of chromium, 10 parts of p hydroxy phenoxyacetic acid and 2.3 parts of isopropanol. The resulting solution contained 6% chromium and gave a clear solution when diluted with water.

The Werner-type complex compound obtained as above described was used for bonding glass to phenol-formaldehyde plastic as described in Example I and a substantial improvement in the strength of the bond, both wet and dry, was obtained as compared to a bond in which no complex was used.

We claim:

1. A complex compound of the Werner type consisting of a monocarboxylic functional acido group made up of a carboxyl radical joined to a group of the class consisting of primary alcohol, phenol and urea groups, the acido group being coordinated, through the carboxyl radical, with a nuclear trivalent chromium atom, the complex also containing additional coordinated nuclear trivalent chromium, the valence and coordination positions of all the nuclear chromium atoms, other than those positions occupied by coordinated functional acido groups, being occupied by groups selected from the class consisting of aquo groups, hydroxyl, and monovalent negative groups which are anions of monobasic acids, and the total number of nuclear trivalent chromium atoms within the complex being from one to ten times the number of coordinated functional acido groups.

2. A complex compound of the Werner type consisting of a monocarboxylic functional acido group made up of a carboxyl radical joined through a hydrocarbon chain to a group of the class consisting of primary alcohol, phenol and urea groups, the acido group being coordinated, through the carboxyl radical, with a nuclear trivalent chromium atom, the complex also containing additional coordinated nuclear trivalent chromium, the valence and coordination positions of all the nuclear chromium atoms, other than those positions occupied by coordinated functional acido groups, being occupied by groups selected from the class consisting of aquo groups, hydroxyl, and monovalent negative groups which are anions of monobasic acids, and the total number of nuclear trivalent chromium atoms within the complex being from one to ten times the number of coordinated functional acido groups.

3. A complex compound of the Werner type consisting of a monocarboxylic functional acido group made up of a carboxyl radical joined to a phenolic group, the acido group being coordinated, through the carboxyl radical, with a nuclear trivalent chromium atom, the complex also containing additional coordinated nuclear trivalent chromium, the valence and coordination positions of all the nuclear chromium atoms, other than those positions occupied by coordinated functional acido groups, being occupied by groups selected from the class consisting of aquo groups, hydroxyl, and monovalent negative groups which are anions of monobasic acids, and the total number of nuclear trivalent chromium atoms within the complex being from one to ten times the number of coordinated functional acido groups.

4. A complex compound of the Werner type consisting of a monocarboxylic functional acido group made up of a carboxyl radical joined to a urea group, the acido group being coordinated, through the carboxyl radical, with a nuclear trivalent chromium atom, the complex also containing additional coordinated nuclear trivalent chromium, the valence and coordination positions of all the nuclear chromium atoms, other than those positions occupied by coordinated functional acido groups, being occupied by groups selected from the class consisting of aquo groups, hydroxyl, and monovalent negative groups which are anions of monobasic acids, and the total number of nuclear trivalent chromium atoms within the complex being from one to ten times the number of coordinated functional acido groups.

5. A complex compound of the Werner type consisting of a monocarboxylic functional acido group made up of a carboxyl radical joined to a group of the class consisting of primary alcohol, phenol and urea groups, the acido group being coordinated, through the carboxyl radical, with a nuclear trivalent chromium atom, the complex also containing additional coordinated nuclear trivalent chromium, the valence and coordination positions of all the nuclear chromium atoms, other than those positions occupied by coordinated functional acido groups, being occupied by groups selected from the class consisting of aquo groups, hydroxyl, and monovalent negative groups which are anions of monobasic acids, and the total number of nuclear trivalent chromium atoms within the complex being about two times the number of coordinated functional acido groups.

6. In a process for producing a Werner-type complex compound in which a monocarboxylic functional acido group made up of a carboxyl radical joined to a group of the class consisting of primary alcohol, phenol and urea groups is coordinated through the carboxyl with a nuclear trivalent chromium atom, the step comprising effecting contact, in solution, between a monocarboxylic acid in which the carboxyl is joined to a group of the class consisting of primary alcohol, phenol and urea groups, and a basic trivalent chromium salt of a monobasic acid, the basicity of the chromium salt being no greater than about 50% and the mole proportion of chromium to monocarboxylic acid being from 1:1 to 10:1.

7. In a process for producing a Werner-type complex compound in which a monocarboxylic functional acido group made up of a carboxyl radical joined through a hydrocarbon chain to a group of the class consisting of primary alcohol, phenol and urea groups is coordinated through the carboxyl with a nuclear trivalent chromium atom, the step comprising effecting contact, in solution, between a monocarboxylic acid in which the carboxyl is joined through a hydrocarbon chain to a group of the class consisting of primary alcohol, phenol and urea groups, and a basic trivalent chromium salt of a monobasic acid, the basicity of the chromium salt being no greater than about 50% and the mole proportion of chromium to monocarboxylic acid being from 1:1 to 10:1.

8. In a process for producing a Werner-type complex compound in which a monocarboxylic functional acido group made up of a carboxyl radical joined to a primary alcohol group is coordinated through the carboxyl with a nuclear trivalent chromium atom, the step comprising effecting contact, in solution, between a monocarboxylic acid in which the carboxyl is joined to a primary alcohol group, and a basic trivalent chromium salt of a monobasic acid, the basicity of the chromium salt being no greater than about 50% and the mole proportion of chromium to monocarboxylic acid being from 1:1 to 10:1.

9. In a process for producing a Werner-type complex compound in which a monocarboxylic functional acido group made up of a carboxyl radical joined to a phenol group is coordinated through the carboxyl with a nuclear trivalent chromium atom, the step comprising effecting contact, in solution, between a monocarboxylic acid in which the carboxyl is joined to a phenol group, and a basic trivalent chromium salt of a monobasic acid, the basicity of the chromium salt being no greater than about 50% and the mole proportion of chromium to monocarboxylic acid being from 1:1 to 10:1.

10. In a process for producing a Werner-type complex compound in which a monocarboxylic functional acido group made up of a carboxyl radical joined to a urea group is coordinated through the carboxyl with a nuclear trivalent chromium atom, the step comprising effecting contact, in solution, between a monocarboxylic acid in which the carboxyl is joined to a urea group, and a basic trivalent chromium salt of a monobasic acid, the basicity of the chromium salt being no greater than about 50% and the mole proportion of chromium to monocarboxylic acid being from 1:1 to 10:1.

11. In a process for producing a Werner-type complex compound in which a monocarboxylic functional acido group made up of a carboxyl radical joined to a group of the class consisting of primary alcohol, phenol and urea groups is coordinated through the carboxyl with a nuclear trivalent chromium atom, the step comprising effecting contact, in solution, between a monocarboxylic acid in which the carboxyl is joined to a group of the class consisting of primary alcohol, phenol and urea groups, and a basic trivalent chromium salt of a monobasic acid, the basicity of the chromium salt being no greater than about 50% and the mole proportion of chromium to monocarboxylic acid being about 2:1.

12. An article wherein there is a material containing on its surface above about 5% of an element having an atomic weight of from 14 to 16, inclusive, the material being coated with an alkylol-condensation polymer and a complex compound of the Werner type consisting of a monocarboxylic functional acido group made up of a carboxyl radical joined to a group of the class consisting of primary alcohol, phenol and urea groups, the acido group being coordinated, through the carboxyl radical, with a nuclear trivalent chromium atom, the complex also containing additional coordinated nuclear trivalent chromium, the valence and coordination positions of all the nuclear chromium atoms, other than those positions occupied by coordinated functional acido groups, being occupied by groups selected from the class consisting of aquo groups, hydroxyl, and monovalent negative groups which are anions of monobasic acids, and the total number of nuclear trivalent chromium atoms within the complex being from one to ten times the number of coordinated functional acido groups.

13. An article wherein there is a material containing on its surface above about 5% of an element having an atomic weight of from 14 to 16, inclusive, the material being selected from the group consisting of vitreous, cellulosic and polyamide materials and metals bearing an oxygen-containing film, and being coated with an alkylol-condensation polymer and a complex compound of the Werner type consisting of a monocarboxylic functional acido group made up of a carboxyl radical joined to a group of the class consisting of primary alcohol, phenol and urea groups, the acido group being coordinated, through the carboxyl radical, with a nuclear trivalent chromium atom, the complex also containing additional coordinated nuclear trivalent chromium, the valence and coordination positions of all the nuclear chromium atoms, other than those positions occupied by coordinated functional acido groups, being occupied by groups selected from the class consisting of aquo groups, hydroxyl, and monovalent negative groups which are anions of monobasic acids, and the total number of nuclear trivalent chromium atoms within the complex being from one to ten times the number of coordinated functional acido groups.

14. A laminated article with laminae of a material containing on its surface above about 5% of an element having an atomic weight of from 14 to 16, inclusive, the laminae being bonded with an alkylol-condensation polymer and a complex of the Werner type consisting of a monocarboxylic functional group made up of a carboxyl radical joined to a group of the class consisting of primary alcohol, phenol and urea groups, the acido group being coordinated, through the carboxyl radical, with a nuclear trivalent chromium atom, the complex also containing additional coordinated nuclear trivalent chromium, the valence and coordination positions of all the nuclear chromium atoms, other than those positions occupied by coordinated functional acido groups, being occupied by groups selected from the class consisting of aquo groups, hydroxyl, and monovalent negative groups which are anions of monobasic acids, and the total number of nuclear trivalent chromium atoms within the complex being from one to ten times the number of co-ordinated functional acido groups.

15. A laminated article with laminae of a material containing on its surface above about 5% of an element having an atomic weight of from 14 to 16, inclusive, the material being selected from the group consisting of vitreous, cellulosic and polyamide materials and metals bearing an oxygen-containing film, the laminae being bonded with an alkylol-condensation polymer and a complex compound of the Werner type consisting of a monocarboxylic functional acido group made up of a carboxyl radical joined to a group of the class consisting of primary alcohol, phenol and urea groups, the acido group being coordinated, through the carboxyl radical, with a nuclear trivalent chromium atom, the complex also containing additional coordinated nuclear trivalent chromium, the valence and coordination positions of all the nuclear chromium atoms, other than those positions occupied by coordinated functional acido groups, being occupied by groups selected from the class consisting of aquo groups, hydroxyl, and monovalent negative groups which are anions of monobasic acids, and the total number of nuclear trivalent chromium atoms within the complex being from one to ten times the number of coordinated functional acido groups.

16. A laminated article with laminae of glass bonded with an alkylol-condensation polymer and a complex compound of the Werner type consisting of a monocarboxylic functional acido group made up of a carboxyl radical joined to a group of the class consisting of primary alcohol, phenol and urea groups, the acido group being coordinated, through the carboxyl radical, with a nuclear trivalent chromium atom, the complex also containing additional coordinated nuclear trivalent chromium, the valence and coordination positions of all the nuclear chromium atoms, other than those positions occupied by coordinated functional acido groups, being occupied by groups selected from the class consisting of aquo groups, hydroxyl, and monovalent negative groups which are anions of monobasic acids, and the total number of nuclear trivalent chromium atoms within the complex being from one to ten times the number of coordinated functional acido groups.

MAX T. GOEBEL.
RALPH K. ILER.

REFERENCES CITED

The following references are of record in the file of this patent:

UNITED STATES PATENTS

| Number | Name | Date |
|---|---|---|
| 1,889,383 | Schmidt | Nov. 29, 1932 |
| 1,964,696 | Traube et al. | June 26, 1934 |
| 2,054,489 | Stusser et al. | Sept. 15, 1936 |
| 2,091,683 | Immendoefer | Aug. 31, 1937 |
| 2,215,429 | Schmidt et al. | Sept. 17, 1940 |
| 2,271,228 | Nadeau et al. | Jan. 27, 1942 |
| 2,273,040 | Iler | Feb. 17, 1942 |
| 2,356,161 | Iler | Aug. 22, 1944 |
| 2,374,657 | Bain | May 1, 1945 |
| 2,381,752 | Iler | Aug. 7, 1945 |

FOREIGN PATENTS

| Number | Country | Date |
|---|---|---|
| 114,189 | Great Britain | Mar. 20, 1918 |

OTHER REFERENCES

Schiff: Ann. der Chem. and Pharm., vol. 125, pp. 144–145 (1863).

Kiliani: Ber. Deut. Chem., vol. 41, pp. 2652–2654 (1908).

Carter et al.: Jour. Chem. Soc. (London), vol. 77, pp. 1222–1227 (1900).

Seuhofer et al.: Jaheres berichte uber die Fort. Chem., vol. 33, pp. 835–839 (1880).

Weinland et al.: "Zeit. anorg. allgem. Chem.," vol. 126 (1923), pp. 285 to 303.

Ellis: "Chemistry of Synthetic Resins," vol. I (1935), pp. 574, 576, 577.